3,161,325
EXPULSION DEVICE
Lester H. Hinkel, Benton Harbor, and George Boswinkle, St. Joseph, Mich., assignors to the United States of America as represented by the Secretary of the Air Force
Filed June 19, 1963, Ser. No. 289,148
1 Claim. (Cl. 222—80)

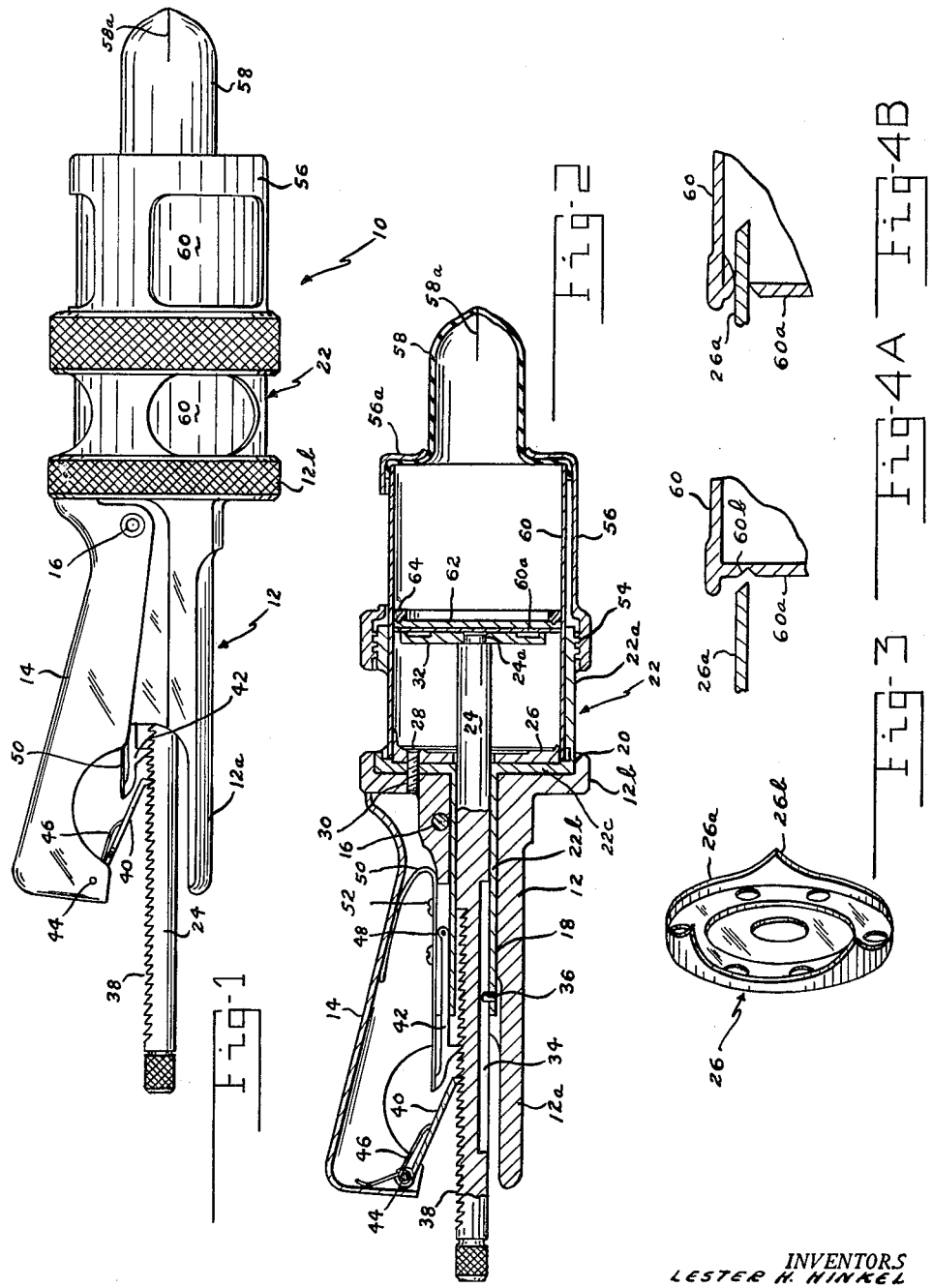

This invention relates to devices used to expel the contents from the open end of a container, by means of a pressure pad pushing on the contents from the other end of the container. More specifically, the invention relates to a device for holding a food container and expelling the foot contents directly into the mouth of the consumer, through a flexible mouthpiece joined to the open end of the container; the container having been previously opened and the mouthpiece attached in the container opener of the co-pending application titled Container Opener by inventors Warren R. Hafstrom et al.

The present invention has a valuable application in connection with the feeding of personnel in aerospace vehicles under conditions of weightlessness or zero gravity. As is well known, under weightless conditions, free objects will float in the atmosphere regardless of their mass under the earth's gravitational influence. Floating objects tend to remain in motion; and when such objects are food, in addition to usual problems, there are the problems of spoilage and putrification.

It is extremely desirable that food ingested by spacecraft personnel be taken into the body without migration of particles into the craft's interior. This requirement has necessitated new feeding techniques, not only in the preparation and packaging of the food, but also in the handling and transfer thereof.

A primary object of the present invention is to provide an expulsion device for transferring semisolid food directly from the container into the body.

Another object of this invention is to provide an expulsion device which is operable with one hand.

Still another object of the invention is to provide an expulsion device meeting the reliability requirements of space hardware.

Yet another object of this invention is to provide an expulsion device having means for severing the bottom of a food container and rolling out the raw edge.

Additional objects, advantages and features of the invention reside in the construction, arrangement and combination of parts involved in the embodiment of the invention as will appear from the following description and accompanying drawing, wherein:

FIG. 1 is a side view of the device;

FIG. 2 is a cross section through the device shown on FIG. 1 and showing the pressure pad at about the midpoint of the food container;

FIG. 3 is a perspective of the cutter which severs the bottom of the food container;

FIG. 4A is an enlarged fragmentary cross section through a portion of the food container and cutter just prior to engagement of the cutter with the scored end of the container; and FIG. 4B is a view similar to FIG. 4A and showing the severed container end within the cup of the cutter and the manner in which the cutter rolls down and irons out the raw edge left in the container.

Referring to the drawing, the expulsion device will be hereinafter referred to as device 10. The device, which is to be gripped and manipulated by one hand, has an elongated handle 12 and an operating lever 14 which is pivotally joined at one end to the handle by means of a pin or bolt 16. Handle 12 has an elongated gripping portion 12a and a circular portion 12b which is preferably serrated or knurled, as shown, to provide a good gripping surface when inserting or removing the food container.

As best shown on FIG. 2, the elongated handle 12 contains a linear bore 18 and a coaxial counterbore 20 for receiving and positioning body 22. The body 22 has an open end container receiving cylinder 22a having an internal diameter of proper size for slidably receiving a specific size food container, and terminating in a substantially closed end 22c which engages the counterbore in handle 12. The container receiving cylinder 22a is somewhat shorter than the height of the container to be used in the device 10. This permits the open end portion of the container to protrude from the cylinder portion of the body. Joined to and extending outwardly from closed end 22c of the cylinder on the body is a coaxial stem 22b which slidably enters bore 18 of handle 12. Stem 22b is bored to slidably receive rod 24.

Contained within the cylinder on body 22 and adjacent to the closed end 22c thereof is a cutter 26. The cutter is retained in position, and together with body 22, is joined to the handle 12 by a plurality of screws 28 which pass through the cutter and the body to engage threads 30 in the handle. As best shown on FIG. 3, the cutter 26 has a thin cup portion 26a having an external diameter of proper size for ironing out any sharp edges remaining in the container after the end thereof has been severed. The rim edge of the cup terminates in a plurality of knife points 26b axially extending from the periphery of rim 26a. The entire edge of the cup, including the knife points is chisel sharpened as indicated on FIG. 4A and 4B. The operation of cutter 26 will be hereinafter explained.

The inner end of rod 24 terminates in a reduced diameter 24a. Circular pressure pad 32 contains an axial bore through which the reduced diameter 24a passes where it is then riveted over to join the pressure pad to the rod. When the rod 24 is in the retracted position, the pressure pad nests within rim 26a of cutter 26.

Rod 24, which is axially slibable within the bore of stem 22b on body 22, contains a linear slot 34. The slot slidably engages pin 36 to prevent rotation of the rod and to retain the rod within the device. Also cut onto rod 24, as shown, are a plurality of buttress teeth forming a linear rack 38 in angular displacement of slot 34 on the periphery of the rod.

Engaging with rack 38 on rod 24 are two pawls; an actuating pawl 40 and a retaining pawl 42. Actuating pawl 40 is pivotally retained at one end within operating lever 14 by pin 44, and has its opposite end releasably biased to engage the rack by means of spring 46. The retaining pawl 42 is pivotally joined to handle 12 by means of pin 48 and has its opposite end biased to releasably engage the rack by means of spring 50. The retaining pawl prevents the uncontrolled retraction of the rod from the furthermost position advanced by the actuating pawl. Spring 50, which is preferably a flat spring in U-shape form, is joined to handle 12 by means of screws 52. One end of the spring 50 is in engagement with and biases the operating lever to the open position shown on the drawing. The other end of spring 50 biases the retaining pawl 42 into releasable engagement with the rack on rod 24. When the operating lever 14 is squeezed against handle 12, the actuating pawl 40 advances the rod sufficiently to permit the retaining pawl 42 to engage the next succeeding tooth on the rack. The rod, with attached pressure pad, may be retracted by lifting actuating pawl 40 which, in turn, also lifts retaining pawl 42 to thus disengage both pawls, thereby permitting the rod to be retracted by pulling on the knurled outer end.

The open end of container receiving cylinder 22a of body 22 has external threads preferably of square form, for engaging like female threads in retaining cap 56. The cup-shaped retaining cap 56 has a bore in its base portion 56a through which the end of the mouthpiece 58 having a slit 58a extends or protrudes to be outside of the expulsion device. The base 56a is further contoured to conform with the natural shape of the mouthpiece. The retaining cap is provided with a nonslip gripping surface similar to that on body 22.

In operation, the rod 24 is pulled to the retracted position and the retaining cap 56 is unscrewed. A food container 60, on which one end has been removed and the mouthpiece attached, is housed in the retaining cap with the mouthpiece extending outwardly therefrom through the bore in the base of the cap. The bottom closed end of the food container protruding from the cap is then placed into the container receiving cylinder of the device which will position it in contact with the knife points on the cutter. The closed bottom or end of the food container is circularly prescored near the container rim as indicated by score 60b on FIG. 4A. Scoring the end of the container has been found to be beneficial for proper severing of the bottom and the rolling down and ironing out of the raw edges by the chisel sharpened cutter. As the retaining cap is screwed onto the body, friction between the cap and the mouthpiece becomes greater than friction between the food container and the knife points on the cutter. This causes the container to rotate against the cutter to sever the bottom of the container. The rim of the cutter is designed to roll out and iron down any raw edges in the rim of the container to thereby permit easy removal of the severed bottom when the container is discarded, and to prevent cut fingers. After the container has been forced "home," the astronaut is ready to eat. He places the mouthpiece into his mouth and, as the device is manipulated, the pressure pad 32 forces the severed bottom 60a against the bottom of the floating piston which was placed within and against the bottom end of the food container before the food was packed. This floating piston comprises a metallic disk 62 which supports a plastic seal ring 64 which is in sliding engagement with the interior wall of the container. The purpose of the floating piston is to prevent food leakage through the rear of the container. Although shown and described in connection with the present invention, the food container with floating piston, and the mouthpiece do not constitute a part of this invention. After the food has been expelled from the container, the empty container and the mouthpiece are discarded; after first being sprayed with a suitable chemical solution to retard bacterial growth.

It is to be understood that the embodiment of the present invention as shown and described is to be regarded as illustrative only and that the invention is susceptible to variations, modifications and changes within the scope of the appended claim.

We claim:

An expulsion device for expelling the contents of an open end metal container having an opposing closed end through a flexible mouthpiece attached to the open end thereof; and comprising: an elongated handle having a linear bore, a body having a container receiving cylinder shorter than the container height and substantially closed at the inner end with external threads on the open outer end and further having a coaxial stem extending outwardly from the closed end of the container receiving cylinder and engaging the linear bore in said elongated handle, a cutter within and joined to the closed end of the container receiving cylinder in said body, said cutter having a cup shaped portion with a sharpened rim having an external diameter of substantially the inside diameter of the container and terminating in a plurality of sharpened knife points axially extending from the periphery of the sharpened rim, a plurality of screw means joining said cutter and said body to said handle, a pressure pad axially movable within the cylinder of said body and nesting within said cutter in the retracted position, a rod joined at one end to said pressure pad and coaxially passing through the said cutter, the closed end of the cylinder within said body and the stem extending outwardly from the closed end of the cylinder of said body, said rod having a linear rack on one side adjacent to the free end thereof and a linear slot having angular displacement from the rack on the periphery of said rod, a pin joined to the stem extending from the closed end of the cylinder of said body and slidably engaging the linear slot in said rod, an operating lever pivotally joined to said handle, an actuating pawl pivotally joined at one end to said operating lever, a spring biasing the free end of said actuating pawl into releasable operating engagement with the rack on said rod to axially advance said pressure pad within the cylinder of said body from the retracted position, a retaining pawl pivotally joined to said handle, a U-shaped spring joined to said handle and having one end in engagement with and biasing said operating lever to the open position and the other end in engagement with and biasing said retaining pawl into releasable engagement with the rack on said rod to retain said rod to the furthermost position advanced by said actuating pawl, and a retaining cap housing the upper end of the container with the mouthpiece projecting outwardly through a bore in the base of said retaining cap and having internal threads engaging the external threads on said body for securing the container and flexible mouthpiece within the cylinder while forcing the container against the knife points and sharpened rim on said cutter to sever the closed end of the container and to roll down and iron out the raw edge left in the container permitting said pressure pad to engage the severed end of the container and axially expel the contents of the container.

References Cited by the Examiner

UNITED STATES PATENTS

| | | | |
|---|---|---|---|
| 958,994 | 5/10 | Davis | 222—391 |
| 1,013,454 | 1/12 | Sherbondy | 222—391 X |
| 1,255,813 | 2/18 | Brew | 222—80 |
| 2,115,591 | 4/38 | Sherbondy | 222—327 |
| 2,120,008 | 6/38 | Tear | 222—80 |
| 2,123,712 | 7/38 | Clark | 222—80 |
| 2,512,178 | 6/50 | Sherbondy | 222—327 |
| 2,937,795 | 5/60 | Ciliberti | 222—490 |

RAPHAEL M. LUPO, *Primary Examiner.*

LOUIS J. DEMBO, *Examiner.*